United States Patent
Li

(10) Patent No.: US 11,829,588 B2
(45) Date of Patent: *Nov. 28, 2023

(54) METHOD, APPARATUS, AND SYSTEM FOR GENERATING RESOURCE VALUE TRANSFER REQUEST

(71) Applicant: Tencent Technology (Shenzhen) Company Limited, Guangdong (CN)

(72) Inventor: Long Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/715,881

(22) Filed: Apr. 7, 2022

(65) Prior Publication Data

US 2022/0229528 A1 Jul. 21, 2022

Related U.S. Application Data

(63) Continuation of application No. 15/978,795, filed on May 14, 2018, now Pat. No. 11,360,647, which is a
(Continued)

(30) Foreign Application Priority Data

Apr. 29, 2016 (CN) .......................... 201610286128.8

(51) Int. Cl.
*G06F 3/0484* (2022.01)
*G06K 7/14* (2006.01)
(Continued)

(52) U.S. Cl.
CPC .............. *G06F 3/0484* (2013.01); *G06F 9/44* (2013.01); *G06K 7/1413* (2013.01);
(Continued)

(58) Field of Classification Search
CPC ............ G06F 3/0484; G06F 8/38; G06F 9/44; G06K 7/1413; G06K 7/1417;
(Continued)

(56) References Cited

U.S. PATENT DOCUMENTS

2004/0207663 A1* 10/2004 Asakura ................... G09G 5/14
715/781
2011/0161201 A1 6/2011 Stocker
(Continued)

FOREIGN PATENT DOCUMENTS

| CN | 101894424 A | 11/2010 |
| CN | 103729765 A | 4/2014 |

(Continued)

OTHER PUBLICATIONS

Chinese Office Action for corresponding CN201610286128.8, dated Apr. 29, 2016, partial English translation provided.
(Continued)

*Primary Examiner* — Beau D Spratt
*Assistant Examiner* — Reji Kartholy
(74) *Attorney, Agent, or Firm* — ARENTFOX SCHIFF LLP

(57) ABSTRACT

A method of generating a transfer request is described. A window that is displayed independent of a service interface of a service application and corresponds to the service application is generated by processing circuitry of a first terminal according to an independent window presentation interface. The window that is independent of the service interface of the service application is displayed based on a window display request from the service application. A user operation is received via the window. A transfer code request instruction is generated in response to the received operation. A transfer code corresponding to the transfer code request instruction is obtained when the service application detects the transfer code request instruction. The transfer code is displayed for processing by a second terminal to generate the transfer request.

20 Claims, 6 Drawing Sheets

Related U.S. Application Data continuation of application No. PCT/CN2017/082545, filed on Apr. 28, 2017.

(51) Int. Cl.

| | | |
|---|---|---|
| *G06Q 20/32* | (2012.01) | |
| *G06F 9/44* | (2018.01) | |
| *G07G 1/00* | (2006.01) | |
| *G06V 30/413* | (2022.01) | |
| *G06Q 20/06* | (2012.01) | |
| *G06F 8/38* | (2018.01) | |

(52) U.S. Cl.
CPC ....... *G06K 7/1417* (2013.01); *G06Q 20/0655* (2013.01); *G06Q 20/3274* (2013.01); *G06Q 20/3276* (2013.01); *G06V 30/413* (2022.01); *G07G 1/0081* (2013.01); *G06F 8/38* (2013.01)

(58) Field of Classification Search
CPC ........... G06K 9/00456; G06Q 20/0655; G06Q 20/3274; G06Q 20/3276; G07G 1/0081
See application file for complete search history.

(56) References Cited

U.S. PATENT DOCUMENTS

| | | | |
|---|---|---|---|
| 2011/0191248 A1* | 8/2011 | Bishop | G06Q 20/363 705/67 |
| 2012/0131094 A1 | 5/2012 | Lyons et al. | |
| 2014/0101036 A1* | 4/2014 | Phillips | G06Q 20/3229 705/39 |
| 2015/0026005 A1* | 1/2015 | Shamia | G06Q 30/0633 705/26.8 |
| 2015/0248664 A1* | 9/2015 | Makhdumi | G06Q 20/3274 235/380 |
| 2016/0034155 A1* | 2/2016 | Vranjes | G06F 3/04842 715/803 |
| 2016/0210630 A1* | 7/2016 | Stone | G06Q 20/10 |

FOREIGN PATENT DOCUMENTS

| | | |
|---|---|---|
| CN | 103761484 A | 4/2014 |
| CN | 104216752 A | 12/2014 |
| CN | 104317562 A | 1/2015 |
| CN | 105138217 A | 12/2015 |
| CN | 105955743 A | 9/2016 |

OTHER PUBLICATIONS

International Preliminary Report on Patentability for corresponding PCT/CN2017/082545, dated Oct. 30, 2018, English translation included.

Written Opinion of the ISR for corresponding PCT/CN2017/082545, dated Nov. 2, 2017, English translation included.

Chinese Office Action for corresponding CN201610286128.8, dated Feb. 20, 2019, partial English translation provided.

International Search Report for PCT/CN2017/082545, dated Jul. 26, 2017, 10pages, English translation included.

* cited by examiner

METHOD, APPARATUS, AND SYSTEM FOR GENERATING RESOURCE VALUE TRANSFER REQUEST

RELATED APPLICATION

This application is a continuation of U.S. Ser. No. 15/978,795, filed on May 14, 2018, which is a continuation of International Application No. PCT/CN2017/082545, filed on Apr. 28, 2017, which claims priority to Chinese Patent Application No. 201610286128.8, entitled "METHOD, APPARATUS, AND SYSTEM FOR GENERATING RESOURCE VALUE TRANSFER REQUEST, AND STORAGE MEDIUM" filed on Apr. 29, 2016. The entire disclosures of the prior applications are hereby incorporated by reference in their entirety.

FIELD OF THE TECHNOLOGY

The present disclosure relates to the field of computer technologies for generating a resource value request.

BACKGROUND OF THE DISCLOSURE

With the development of computer technologies, people not only can perform resource value transfer in an off-line manner, but also can perform resource value transfer by using a network. Resource value transfer refers to a process of change of a resource value for identifying a quantity of resources along with transfer of resources from a first account to a second account. Value transfer resources include, but are not limited to, electronic purses, virtual red packets, electronic coupons, bonus point coupons, bonus points, electronic vouchers, game currencies, and virtual objects.

In actual applications, when performing resource value transfer by using a user terminal, a user first needs to enter a resource value transfer application and search the resource value transfer application for a corresponding resource value transfer entry. A starting process of the resource value transfer is relatively complex, and the user cannot start a resource value transfer function at the first time and complete resource value transfer, lowering the efficiency of the resource value transfer.

SUMMARY

Based on the above, for the foregoing technical problem, there is provided a method, an apparatus, and a system for generating a resource value transfer request, so as to improve the efficiency of resource value transfer.

In one embodiment of the present disclosure, there is provided a method for generating a resource value transfer request. In the method, a window is displayed independent of a service interface of a service application displayed on a first terminal in response to a window display request from the service application. A user operation is received via the window. A resource value transfer code request instruction is generated, and a resource value transfer code is obtained when the service application detects the resource value transfer code request instruction. The resource value transfer code is displayed. The resource value transfer code is processed by a second terminal to generate the resource value transfer request.

In another embodiment of the present disclosure, there is provided a first terminal for generating a resource value transfer request. The first terminal includes a memory and circuitry coupled to the memory. The circuitry displays a window that is independent of a service interface of a service application in response to a window display request from the service application. The circuitry receives a user operation via the window, generates a resource value transfer code request instruction in response to the received operation, and obtains a resource value transfer code corresponding to the resource value transfer code request instruction when the service application detects the resource value transfer code request instruction. The resource value transfer code includes resource value transfer information. The circuitry displays the resource value transfer code. A second terminal processes the displayed resource value transfer code to generate the resource value transfer request.

In another embodiment of the present disclosure, there is provided a non-transitory computer-readable storage medium storing a program executable by a processor to perform the method for generating a resource value transfer request. In the method, a window is displayed independent of a service interface of a service application displayed on a first terminal in response to a window display request from the service application. A user operation is received via the window. A resource value transfer code request instruction is generated, and a resource value transfer code is obtained when the service application detects the resource value transfer code request instruction. The resource value transfer code is displayed. The resource value transfer code is processed by a second terminal to generate the resource value transfer request. The window displayed independent of the service interface does not rely on the service interface and is presented in the current interface, and a resource value transfer process can be quickly started without entering a resource value transfer application; a user can easily start resource value transfer by using the window displayed independent of the service interface while browsing web pages, reading news, or performing any other operation, which is convenient and fast and improves the efficiency of resource value transfer.

In another embodiment of the present disclosure, there is provided a system for generating a resource value transfer request. The system includes a first terminal and a second terminal. Circuitry of the first terminal displays a window that is independent of a service interface of a service application in response to a window display request from the service application. The circuitry of the first terminal receives a user operation via the window, generates a resource value transfer code request instruction in response to the received operation, and obtains a resource value transfer code corresponding to the resource value transfer code request instruction when the service application detects the resource value transfer code request instruction. The resource value transfer code includes resource value transfer information. The circuitry of the first terminal displays the resource value transfer code. Circuitry of a second terminal processes the displayed resource value transfer to generate the resource value transfer request.

In the system for generating a resource value transfer request, through cooperation of the first terminal and the second terminal, the circuitry of the first terminal displays a window that is independent of a service interface of a service application in response to a window display request from the service application. The circuitry of the first terminal receives a user operation via the window, generates a resource value transfer code request instruction in response to the received operation, and obtains a resource value transfer code corresponding to the resource value transfer code request instruction when the service application detects the resource value transfer code request instruction. The resource value transfer code includes resource value transfer information. The circuitry of the first terminal displays the resource value transfer code. Circuitry of a second terminal processes the displayed resource value to generate the resource value transfer request. The window displayed independent of the service interface is presented in the current interface, and a resource value transfer process can be quickly started without entering a resource value transfer application; a user can easily start resource value transfer by using the window displayed independent of the service interface and generates the resource value transfer request while browsing web pages, reading news, or performing any other operation, which is convenient and fast and improves the efficiency of resource value transfer.

DESCRIPTION OF EMBODIMENTS

Figure 1:
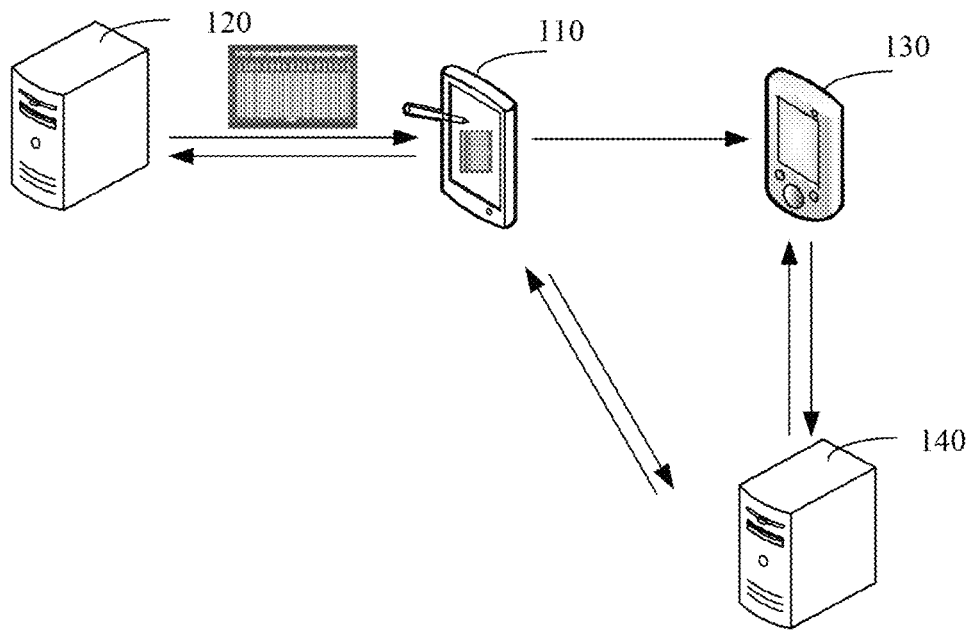
FIG. 1 is a diagram of an application environment of a method for generating a resource value transfer request according to an embodiment.

FIG. 1 is a diagram of an application environment in which a method for generating a resource value transfer request is run according to an embodiment. As shown in FIG. 1, the application environment includes a first terminal 110, a management server 120, a second terminal 130, and a resource value transfer server 140. The first terminal 110, the management server 120, the second terminal 130, and the resource value transfer server 140 perform communication by using a network.

The first terminal 110 and the second terminal 130 may be smartphones, tablet computers, laptop computers, desktop computers, and the like but are not limited thereto. The second terminal 130 includes a graphic code scanning tool, a decoder, and the like. Alternatively, the second terminal 130 may be a special graphic code scanner, a decoder, and the like. The management server 120 may request, according to the resource value transfer code of the first terminal 110, to return the corresponding resource value transfer code. The second terminal 130 may read, by means of scanning or camera photographing, the resource value transfer code presented by the first terminal 110, to obtain resource value transfer information, or the first terminal 110 sends the resource value transfer code to the second terminal 130, and the second terminal 130 decodes the resource value transfer code to obtain resource value transfer information. The second terminal 130 may generate a resource value transfer request according to the resource value transfer information and send the resource value transfer request to the resource value transfer server 140 by using a network. The resource value transfer server 140 completes a resource value transfer according to the resource value transfer request and returns a resource value transfer response to the first terminal 110. The resource value transfer server 140 may be a server or a server cluster.

Figure 2:
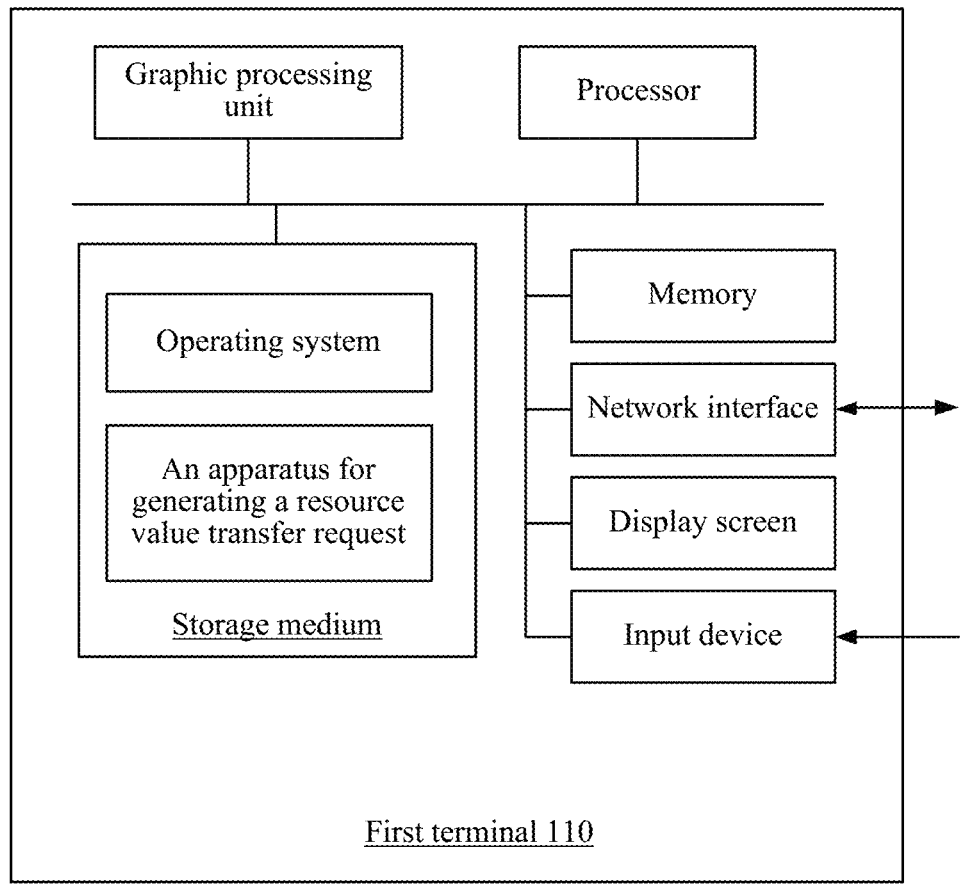
FIG. 2 is a diagram of an internal structure of a first terminal in FIG. 1 according to an embodiment.

In an embodiment, an internal structure of the first terminal 110 in FIG. 1 is shown in FIG. 2. The first terminal 110 includes a processor, a graphic processing unit, a storage medium, a memory, a network interface, a display screen, and an input device that are connected to each other by using a system bus. The storage medium of the first terminal 110 stores an operating system, and further includes an apparatus for generating a resource value transfer request. The apparatus is configured to implement a method for generating a resource value transfer request applicable to the terminal. The processor is configured to provide computing and control capabilities, to support running of the entire first terminal 110. The graphic processing unit in the first terminal 110 is configured to provide at least a drawing capability of a display interface. The memory provides an environment for running of an apparatus for controlling an application in the storage medium. The network interface is configured to perform network communication with the server 120 and the resource value transfer server 140, for example, receive the resource value transfer response returned by the resource value transfer server 140. The display screen is configured to display an application interface and the like, for example, display a resource value transfer code. The input device is configured to receive a command, data, or the like input by a user. The first terminal 110 has a touchscreen, and the display screen and the input device may be the touchscreen.

Figure 3:
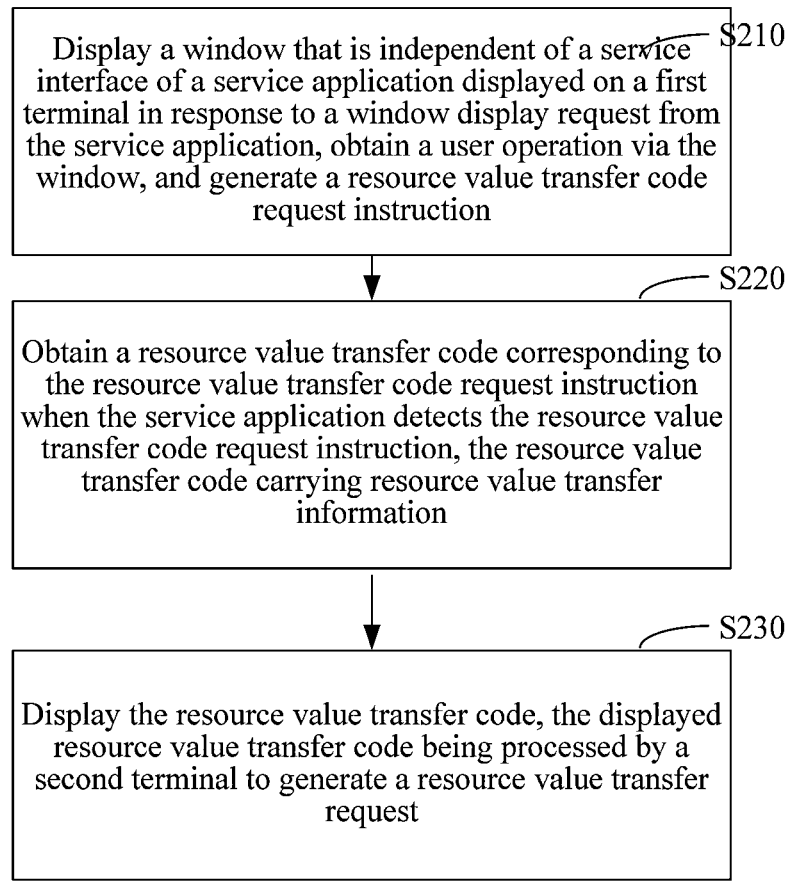
FIG. 3 is a flowchart of a method for generating a resource value transfer request according to an embodiment.

In an embodiment, as shown in FIG. 3, a method for generating a resource value transfer request is provided. An example in which the method is applied to the first terminal 110 in the foregoing application environment is used for description, and the method includes the following steps:

Step S210: Present in a current display interface a window displayed independent of a service interface, obtain an operation applied to the window, and generate a resource value transfer code request instruction. For example, the first terminal 110 displays a window that is independent of a service interface of a service application displayed in response to a window display request from the service application. The first terminal receives a user operation via the window and generates a resource value transfer code request instruction in response to the received operation;

Specifically, the window displayed independent of the service interface, such as a floating window, does not rely on a service application interface and may be generated by using an independent window management algorithm. The independent window management algorithm is different from a window generation algorithm within the service application interface. A window within the service application interface is inherited from a service application and can be displayed only within the service application interface. The window displayed independent of the service interface may be independently displayed outside the service interface, and a location thereof may be randomly moved. The window displayed independent of the service interface corresponds to the service application and is used for starting resource value transfer. The window displayed independent of the service interface and the corresponding service application may be synchronously started. The service application may be run in a background, and the window displayed independent of the service interface is presented in a foreground, that is, the current display interface, and may be presented on a current operation application or on all current applications, so that a resource value transfer process may be quickly and conveniently entered by using the window displayed independent of the service interface without opening a resource value transfer application, which is convenient to operate. Information related to the service application may be displayed on the window displayed independent of the service interface, and different service applications may display different information on the window displayed independent of the service interface, to allow the user to select different resource value transfer means by using displayed information. There may be one or more windows displayed independent of the service interface, and the configuration parameter of the window may be self-defined according to requirements, such as transparency, a size, a presentation location, presentation animation, and being movable or not. Operations on the window displayed independent of the service interface may be click, touch, and the like. Whether an operation applied to the window displayed independent of the service interface satisfies a preset condition may be determined. The resource value transfer code request instruction is generated only when the operation applied to the window displayed independent of the service interface satisfies the preset condition. If the preset condition is that a touching time exceeds three seconds, it may avoid a misoperation that causes starting of resource value transfer. The resource value transfer code request instruction is used for requesting a resource value transfer code, which may carry information such as current operating time and a user identifier. By using the window displayed independent of the service interface, the user can easily start resource value transfer while browsing web pages, reading news, or performing any other operation, which is convenient and fast.

Step S220: Obtain a resource value transfer code corresponding to the resource value transfer code request instruction when the service application corresponding to the window detects the resource value transfer code request instruction, the resource value transfer code including resource value transfer information.

Specifically, the service application, which has a resource value transfer function, may be an application that is specially used for resource value transfer and that is independently installed in a mobile terminal, or may be an instant messaging application, a social network application, a game application, or the like. When the service application is a comprehensive application having multiple functions, such as a social function, a sharing function, and an instant messaging function, the resource value transfer code may be generated by directly using registration information of a user in the service application. Resource value transfer software does not need to be installed alone, and information about resource value transfer may be shared to friends in time by using the messaging application, the social network application, and the game application, so that another user performs same resource value transfer. The resource value transfer code may be generated by using the resource value transfer code request instruction at the terminal, or the resource value transfer code request instruction may be sent to the management server, and the resource value transfer code returned by the management server may be received. Resource value transfer codes corresponding to all resource value transfer code request instructions are different and are valid for a certain periods of time, ensuring security of a resource value transfer process and preventing the resource value transfer code from being broadcast. The resource value transfer code is a graphic code or text code that may restore an encoded character and that is obtained by encoding a character. The graphic code includes a two-dimensional code and a barcode. The resource value transfer code carries resource value transfer information, such as a service application category and a user identifier having a to-be-transferred resource value.

Step S230: Present or display the resource value transfer code, the displayed resource value transfer code being processed by a second terminal to generate a resource value transfer request. For example, the displayed resource value transfer code is acquired by a second terminal which parses the resource value transfer code to obtain resource value transfer information and generates a resource value transfer request according to the resource value transfer information.

Specifically, when being presented, the resource value transfer code may be presented in the window displayed independent of the service interface, or when the service application corresponding to the window detects the resource value transfer code request instruction, the service application may be automatically switched to a foreground, and the resource value transfer code may be presented in the service application. A resource value transfer code parsing algorithm is built in the terminal, and the resource value transfer information may be obtained by parsing the resource value transfer code, and the resource value transfer code may be read in a form of scanning or photographing. Alternatively, the first terminal may actively send the resource value transfer code to the terminal by using network transmission or a near field communication technology such as Bluetooth, so that the terminal receives the resource value transfer code and then performs decoding to obtain the resource value transfer information. After the resource value transfer information is obtained, it may be determined to which resource value transfer server the resource value transfer request is sent, and a resource value transfer money amount corresponding to this resource value transfer may be determined. The resource value transfer request carries the resource value transfer information, to send the resource value transfer information to the resource value transfer server to complete resource value transfer.

In this embodiment, a window displayed independent of a service interface is presented in a current display interface, an operation applied to the window is obtained, and a resource value transfer code request instruction is generated; a resource value transfer code corresponding to the resource value transfer code request instruction is obtained when a service application corresponding to the window detects the resource value transfer code request instruction, the resource value transfer code carrying resource value transfer information; and the resource value transfer code is presented, so that a terminal obtains through parsing the resource value transfer information according to the resource value transfer code and generates a resource value transfer request according to the resource value transfer information. The window displayed independent of the service interface is presented in the current interface, and a resource value transfer process can be quickly started without entering the service application; a user can easily start resource value transfer by using the window displayed independent of the service interface while browsing web pages, reading news, or performing any other operation, which is convenient and fast and improves the efficiency of resource value transfer; payment of a physical commodity and payment of a virtual commodity may be performed by means of value transfer of electronic purses or by means of use transfer of bonus points, electronic coupons, and the like, which is convenient and fast and improves the efficiency of resource value transfer.

In an embodiment, after step S210: the method further includes: modifying a configuration parameter of the window; and updating a display state of the window according to the modified configuration parameter. Step S230 includes: presenting or displaying the resource value transfer code in the window having the updated display state.

Specifically, the configuration parameter of the window displayed independent of the service interface is used for determining the display state of the window, and the configuration parameter, such as transparency, size, presentation location, or presentation animation, of the window may be modified according to requirements. In an embodiment, after the operation applied to the window is obtained, the current length and the current width of the window are modified as integral multiples of the previous length and previous width of the window, so as to amplify the window, or the length and width of the window are adjusted according to a size of a terminal screen, and the presentation location of the window is adjusted according to a central location of the terminal screen, so that the window is presented at the center of the terminal screen. The resource value transfer code is presented in the window having the updated display state. Because a window for starting resource value transfer usually occupies a small area and resource value transfer is started after an operation applied to the window is obtained, the display state of the window needs to be adjusted. For example, the window is amplified to present the resource value transfer code with a more proper size.

Figure 4:
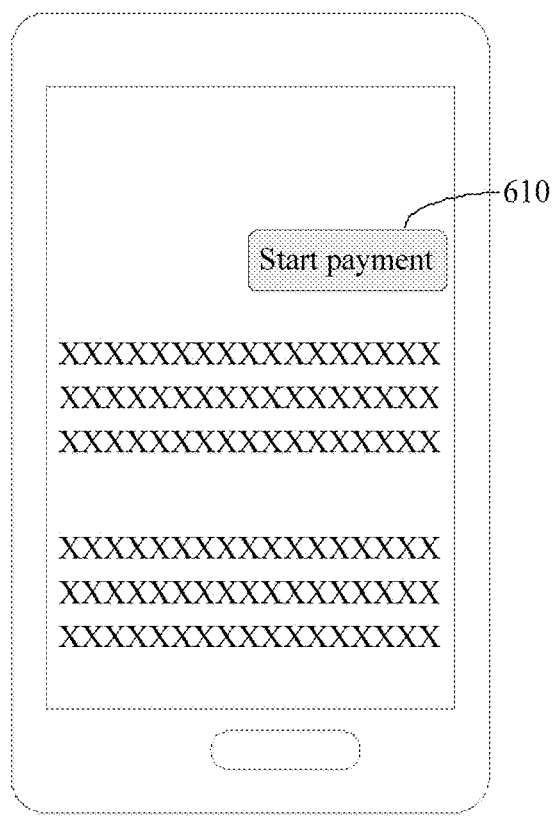
FIG. 4 is a schematic diagram of an initial state of a window displayed independent of a service interface according to an embodiment.
Figure 5:
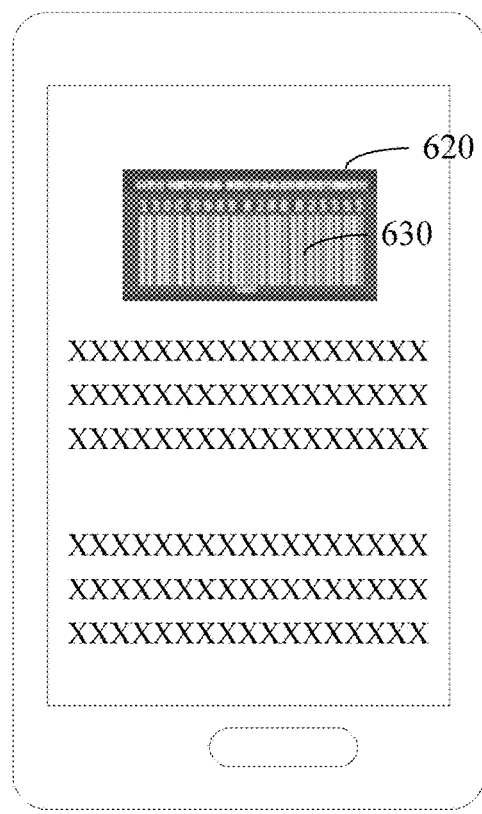
FIG. 5 is a schematic diagram of presenting a resource value transfer code in a window displayed independent of a service interface according to an embodiment.

In a specific embodiment, as shown in FIG. 4, FIG. 4 is a schematic diagram of an initial presentation state of the window. A presentation location of a window 610 (content displayed in the window is "start payment") is located at the right of a desktop and occupies a small area. After the operation applied to the window is obtained, as shown in FIG. 5, an amplified window 620 is obtained, boundaries of the window 620 are transparent and lineless, and a resource value transfer code 630 is presented in the amplified window 620.

Figure 6:
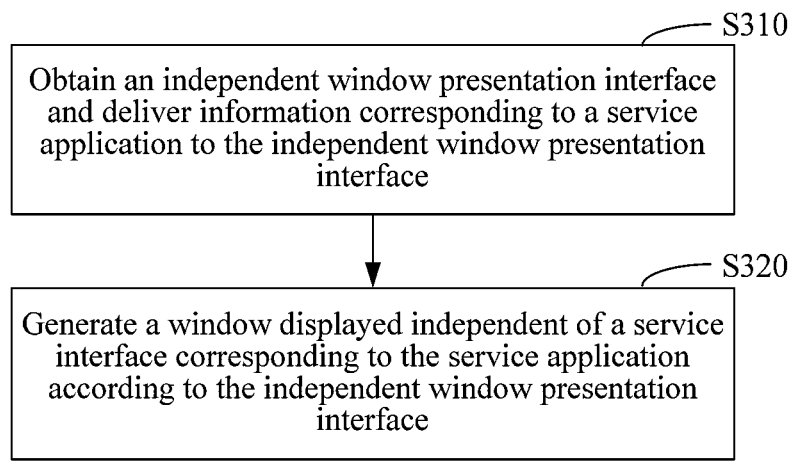
FIG. 6 is a flowchart of generating a window displayed independent of a service interface according to an embodiment.

In an embodiment, as shown in FIG. 6, before step S210, the method further includes:

Step S310: Obtain an independent window presentation interface and deliver information corresponding to the service application to the independent window presentation interface.

Specifically, the independent window presentation interface is an interface in which a presentation program of the window displayed independent of the service interface is implemented, the window displayed independent of the service interface of corresponding content may be presented only by calling an interface and delivering content that needs to be presented. For an Android system, the system carries an independent window presentation interface, which may be directly used. For another terminal with a customized system, if a use permission of the window displayed independent of the service interface needs to be manually started, the user may be prompted to start the permission of the window displayed independent of the service interface. Information corresponding to the service application includes a name of the service application, a resource value transfer manner, and the like.

Step S320: Generate the window displayed independent of the service interface corresponding to the service application according to the independent window presentation interface.

Specifically, presentation content corresponding to the window and the configuration parameter corresponding to the window are both delivered to the independent window presentation interface. The independent window presentation interface determines an initial display state of the window displayed independent of the service interface according to the configuration parameter and displays the presentation content in the window displayed independent of the service interface. A process of implementing the window displayed independent of the service interface is encapsulated in an interface by using the independent window presentation interface, and the corresponding window displayed independent of the service interface may be quickly generated as long as corresponding information is delivered.

In an embodiment, the window is generated by using a corresponding view adding interface of a window management type provided by a system, the window modifies a configuration parameter by using a view update interface provided by the system, and the window is removed by using a view removal interface provided by the system.

Specifically, for an Android system, a function of the window displayed independent of the service interface may be implemented directly by using the window management type WindowManager, and by calling a view adding method interface WindowManager.addView method of this type, the presentation content corresponding to the window is displayed by using the window displayed independent of the service interface, the configuration parameter of the window is updated by using a view update interface updateViewLayout, and the display state of the window is quickly changed. The window is removed by using a view removal interface removeView. According to the interfaces provided by the system, the window displayed independent of the service interface is presented, and state change and removal is implemented, which is simple and convenient.

In an embodiment, step S220 of the obtaining a resource value transfer code corresponding to the resource value transfer code request instruction includes: sending the resource value transfer code request instruction to a management server, so that the management server generates the corresponding resource value transfer code according to the resource value transfer code request instruction and returns the resource value transfer code.

Specifically, the management server may generate a corresponding resource value transfer code according to a preset generation method, for example, extract time information carried in the resource value transfer code request instruction and generate a corresponding resource value transfer code according to the time information. In an embodiment, refresh of the resource value transfer code is completed by using an interface function boolean updateQR (String url). In each user operation, a latest resource value transfer barcode is obtained from the management server, and is updated and displayed in the terminal.

Figure 7:
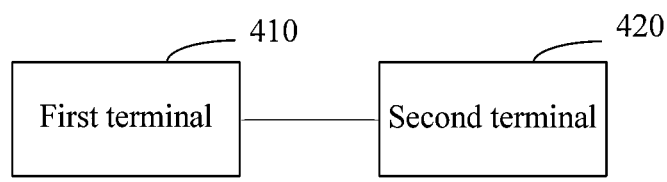
FIG. 7 is a structural block diagram of a system for generating a resource value transfer request according to an embodiment.

In an embodiment, as shown in FIG. 7, a system for generating a resource value transfer request is provided, including a first terminal 410 and a second terminal 420.

The first terminal 410 is configured to display a window on top of a service interface of a service application displayed on a first terminal in response to a window display request from the service application, the displayed window being displayed independently of the service interface of the service application, receive a user operation via the window, generate a resource value transfer code request instruction in response to the received operation, and obtain a resource value transfer code corresponding to the resource value transfer code request instruction when the service application detects the resource value transfer code request instruction, the resource value transfer code including resource value transfer information, and display the resource value transfer code.

Specifically, the window displayed independent of the service interface, such as a floating window, does not rely on a service application interface and is generated by using an independent window management interface. The independent window management interface is different from a window interface within the service application interface. The window interface within the service application interface is inherited from a service application and can be displayed only within the service application interface. The window displayed independent of the service interface may be independently displayed outside the service interface, and a location thereof may be randomly moved. The window displayed independent of the service interface corresponds to the service application and is used for starting resource value transfer. The window displayed independent of the service interface and the corresponding service application may be synchronously started. The service application may be run in a background, and the window displayed independent of the service interface is presented in a foreground, that is, the current display interface, and may be presented on a current operation application or on all current applications, so that a resource value transfer process may be quickly and conveniently entered by using the window displayed independent of the service interface without opening a resource value transfer application, which is convenient to operate. Information related to the service application may be displayed on the window displayed independent of the service interface, and different service applications may display different information on the window displayed independent of the service interface, to allow the user to select different resource value transfer means by using displayed information. There may be one or more windows displayed independent of the service interface, and the configuration parameter of the window may be self-defined according to requirements, such as transparency, a size, a presentation location, presentation animation, and being movable or not. Operations on the window displayed independent of the service interface may be click, touch, and the like. Whether an operation applied to the window displayed independent of the service interface satisfies a preset condition may be determined. The resource value transfer code request instruction is generated only when the operation applied to the window displayed independent of the service interface satisfies the preset condition. If the preset condition is that a touching time exceeds three seconds, it may avoid a misoperation that causes starting of resource value transfer. The resource value transfer code request instruction is used for requesting a resource value transfer code, which may carry information such as current operating time and a user identifier. By using the window displayed independent of the service interface, the user can easily start resource value transfer by using the window displayed independent of the service interface while browsing web pages, reading news, or performing any other operation, which is convenient and fast.

The service application has a resource value transfer function, may be an application that is specially used for resource value transfer and that is independently installed in a mobile terminal, or may be an instant messaging application, a social network application, a game application, or the like. The resource value transfer code may be generated by using the resource value transfer code request instruction at the terminal, or the resource value transfer code request instruction may be sent to the management server, and the resource value transfer code returned by the management server may be received. Resource value transfer codes corresponding to all resource value transfer code request instructions are different and have certain timeliness, ensuring security of a resource value transfer process and preventing the resource value transfer code from being broadcast. The resource value transfer code is a graphic code or text code that may restore an encoded character and that is obtained by encoding a character. The graphic code includes a two-dimensional code and a barcode. The resource value transfer code carries resource value transfer information, such as a resource value transfer application category and a user identifier having a to-be-transferred resource value. When being presented, the resource value transfer code may be presented in the window displayed independent of the service interface, or when the service application corresponding to the window detects the resource value transfer code request instruction, the resource value transfer application may be automatically switched to a foreground, and the resource value transfer code may be presented in the service application.

The second terminal 420 is configured to acquire the displayed resource value transfer code, parse the displayed resource value transfer code to obtain the resource value transfer information, and generate a resource value transfer request according to the obtained resource value transfer information.

Specifically, a resource value transfer code parsing algorithm is built in the second terminal, and the resource value transfer information may be obtained by parsing the resource value transfer code, and the resource value transfer code may be read in a form of scanning or photographing. Alternatively, the first terminal may actively send the resource value transfer code to the second terminal by using network transmission or a near field communication technology such as Bluetooth, so that the second terminal receives the resource value transfer code and then performs decoding to obtain the resource value transfer information. After the resource value transfer information is obtained, it may be determined to which resource value transfer server the resource value transfer request is sent, and a resource value transfer money amount corresponding to this resource value transfer may be determined. The resource value transfer request carries the resource value transfer information, to send the resource value transfer information to the resource value transfer server to complete resource value transfer.

In this embodiment, through cooperation of the first terminal and the second terminal, the first terminal presents in a current display interface a window displayed independent of a service interface, obtains an operation applied to the window, generates a resource value transfer code request instruction, obtains a resource value transfer code corresponding to the resource value transfer code request instruction when a service application corresponding to the window detects the resource value transfer code request instruction, the resource value transfer code carrying resource value transfer information, and presents the resource value transfer code; the second terminal obtains through parsing the resource value transfer information according to the resource value transfer code and generates a resource value transfer request according to the resource value transfer information. The window displayed independent of the service interface is presented in the current interface, and a resource value transfer process can be quickly started without entering the service application; a user can easily start resource value transfer by using the window displayed independent of the service interface and generates the resource value transfer request while browsing web pages, reading news, or performing any other operation, which is convenient and fast and improves the efficiency of resource value transfer.

Figure 8:
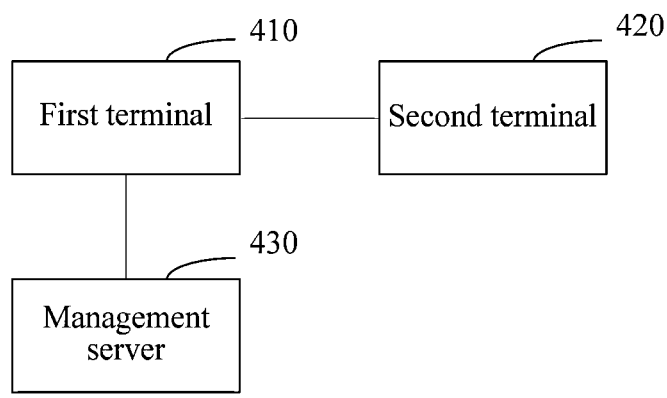
FIG. 8 is a structural block diagram of a system for generating a resource value transfer request according to another embodiment.

In an embodiment, as shown in FIG. 8, the system further includes a management server 430, and the first terminal 410 is further configured to send the resource value transfer code request instruction to the management server 430. The management server 430 is configured to generate the corresponding resource value transfer code according to the resource value transfer code request instruction and return the resource value transfer code.

Specifically, the management server may generate a corresponding resource value transfer code according to a preset generation method, for example, extract time information carried in the resource value transfer code request instruction sent by the first terminal and generate a corresponding resource value transfer code according to the time information. In an embodiment, refresh of the resource value transfer code is completed by using an interface function boolean updateQR(String url). In each user operation, a latest resource value transfer barcode is obtained from the management server, and is updated and displayed in the terminal.

Figure 9:
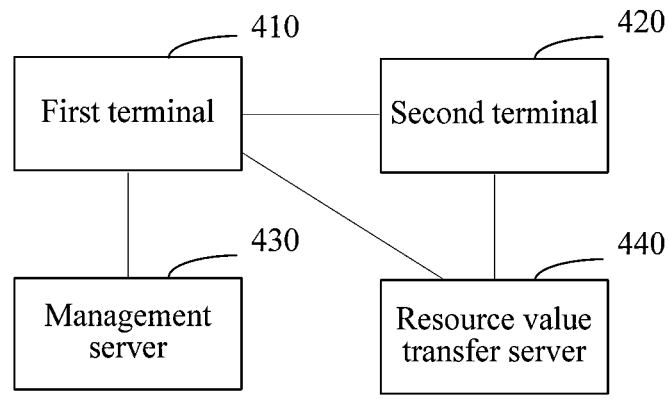
FIG. 9 is a structural block diagram of a system for generating a resource value transfer request according to still another embodiment.

In an embodiment, as shown in FIG. 9, the system further includes a resource value transfer server 440, and the second terminal is further configured to send the resource value transfer request to the resource value transfer server 440. The resource value transfer server 440 is configured to complete resource value transfer according to the resource value transfer request and return a resource value transfer response to the terminal.

Specifically, the resource value transfer request carries a user identifier having a to-be-transferred resource value, a money amount of the to-be-transferred resource value, a resource value transfer manner, and the like. The second terminal obtains the corresponding resource value transfer server according to the resource value transfer manner. The resource value transfer may be distinguished by a resource value transferor. For example, the Bank of China and the Industrial and Commercial Bank of China correspond to different resource value transfer servers. The resource value transfer request is sent to the resource value transfer server, the resource value transfer server obtains a corresponding account having a to-be-transferred resource value according to the user identifier having the to-be-transferred resource value carried in the resource value transfer request, and the money amount of the to-be-transferred resource value is deducted from the account having the to-be-transferred resource value. In addition, the resource value transfer response is returned according to a result of resource value transfer, for example, succeeding in resource value transfer, failing in resource value transfer, and specific resource value transfer information.

In an embodiment, the first terminal 410 is further configured to modify a configuration parameter of the window displayed independent of the service interface, update, according to the modified configuration parameter, a display state of the window displayed independent of the service interface, and present the resource value transfer code in the window that is displayed independent of the service interface and that has the updated display state.

In an embodiment, the first terminal 410 is further configured to: obtain an independent window presentation interface and deliver information corresponding to the service application to the independent window presentation interface; and generate, according to the independent window presentation interface, the window that is displayed independent of the service interface and that corresponds to the service application.

Figure 10:
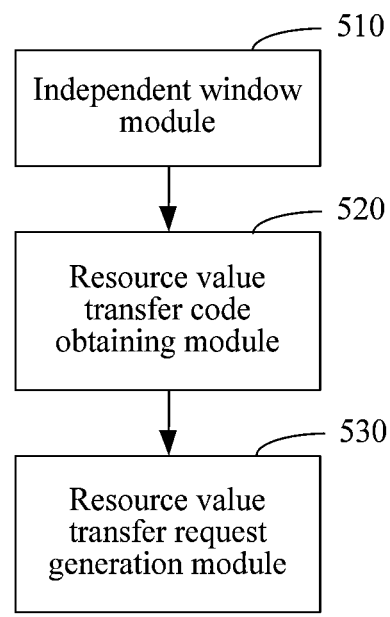
FIG. 10 is a structural block diagram of an apparatus for generating a resource value transfer request according to an embodiment.

In an embodiment, as shown in FIG. 10, an apparatus for generating a resource value transfer request, the apparatus including: a memory, a processor, and circuitry coupled to the memory including one or more functional modules that are stored in the memory and can be run on the processor, the functional modules stored in the memory including:

an independent window module 510, configured to display a window on top of a service interface of a service application displayed on a first terminal in response to a window display request from the service application, the displayed window being displayed independently of the service interface of the service application, receive a user operation via the window, and generate a resource value transfer code request instruction;

a resource value transfer code obtaining module 520, configured to obtain a resource value transfer code corresponding to the resource value transfer code request instruction when the service application corresponding to the window detects the resource value transfer code request instruction, the resource value transfer code including resource value transfer information; and a resource value transfer request generation module 530, configured to display the resource value transfer code, so that a second terminal acquires the displayed resource value transfer code, obtains through parsing the resource value transfer information according to the resource value transfer code and generates a resource value transfer request according to the resource value transfer information.

Figure 11:
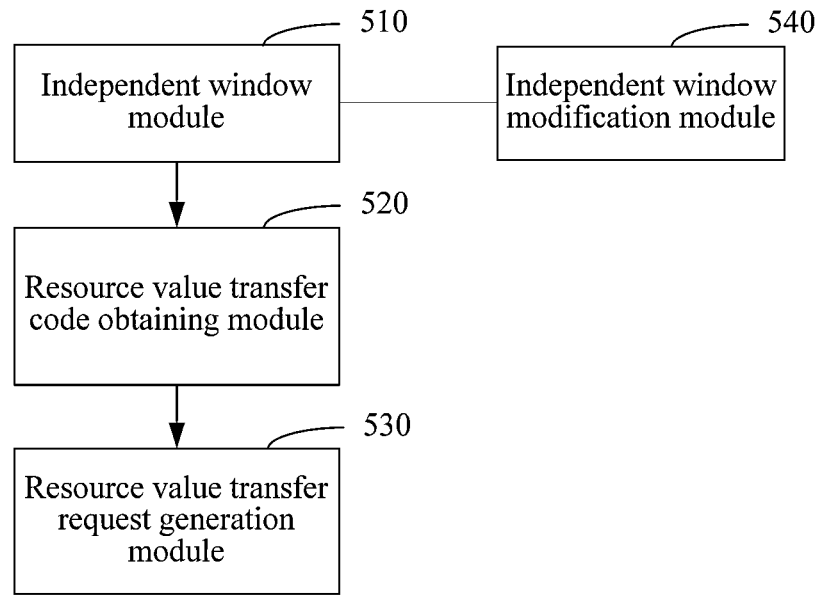
FIG. 11 is a structural block diagram of an apparatus for generating a resource value transfer request according to another embodiment.

In an embodiment, as shown in FIG. 11, the apparatus further includes:

an independent window modification module 540, configured to: modify a configuration parameter of the window; and update a display state of the window according to the modified configuration parameter, where the resource value transfer request generation module 530 is further configured to display the resource value transfer code in the window having the updated display state.

Figure 12:
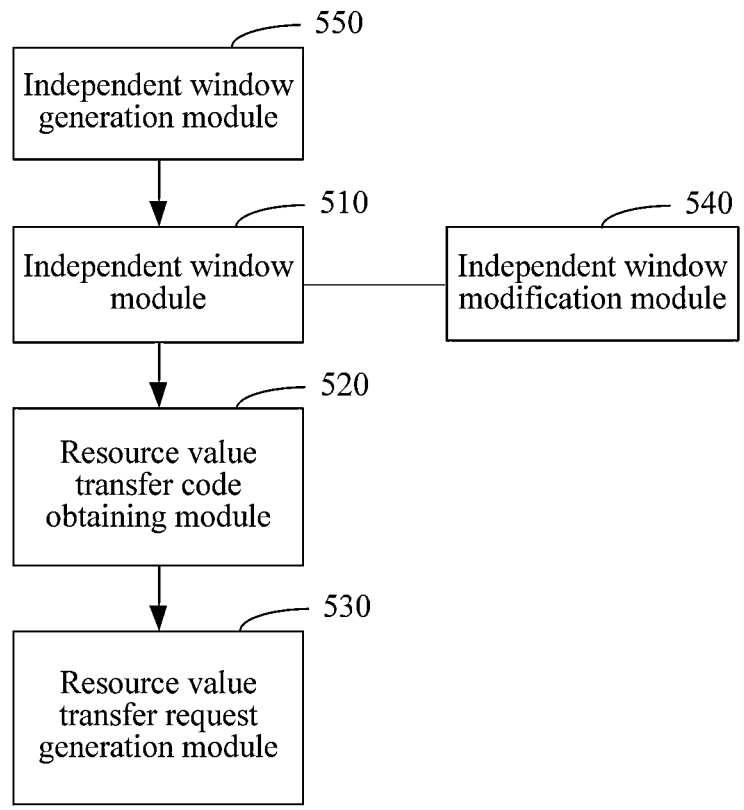
FIG. 12 is a structural block diagram of an apparatus for generating a resource value transfer request according to still another embodiment.

In an embodiment, as shown in FIG. 12, the apparatus further includes:

an independent window generation module 550, configured to: obtain an independent window presentation interface and deliver information corresponding to the service application to the independent window presentation interface; and generate, according to the independent window presentation interface, the window that is displayed independent of the service interface and that corresponds to the service application.

In an embodiment, the window is generated by using a corresponding view adding interface of a window management type provided by a system, the window modifies a configuration parameter by using a view update interface provided by the system, and the window is removed by using a view removal interface provided by the system.

In an embodiment, the resource value transfer code obtaining module 520 is further configured to send the resource value transfer code request instruction to a management server, so that the management server generates the corresponding resource value transfer code according to the resource value transfer code request instruction and returns the resource value transfer code.

In actual applications, functions implemented by units in the apparatus for generating a resource value transfer request are all implemented by processing circuitry including a central processing unit (CPU), a micro processing unit (MPU), a digital signal processor (DSP), or a field programmable gate array (FPGA) located in the apparatus for generating a resource value transfer request.

A person of ordinary skill in the art may understand that all or some of the processes in the methods of the foregoing embodiments may be implemented by a computer program instructing relevant hardware. The program may be stored in a non-transitory computer readable storage medium. For example, in the embodiments of the present disclosure, the program may be stored in a non-transitory storage medium of a computer system, and is executed by at least one processor in the computer system, to implement the process including the foregoing method embodiments. The storage medium may be a magnetic disk, an optical disc, a read-only memory (ROM), a random access memory (RAM), or the like.

Correspondingly, an embodiment of the present disclosure further provides a non-transitory storage medium, storing a computer program, and the computer program being configured to perform the method for generating a resource value transfer request in the embodiments of the present disclosure.

Various technical features in the foregoing embodiments may be combined randomly. For the sake of brevity, not all the possible combinations of various technical features in the foregoing embodiments are described. However, the combinations of the technical features are considered as falling within the scope recorded in this specification provided that the combinations of the technical features are compatible with each other.

The foregoing embodiments are merely several implementations of the present disclosure, which are described in a relatively specific and detailed manner. However, this should not be constructed as a limitation to the scope of the present disclosure. It is noted that a person of ordinary skill in the art may make various changes and improvements without departing from the ideas of the present disclosure, which shall fall within the protection scope of the present disclosure. Therefore, the protection scope of the patent of the present disclosure shall be subject to the claims.

What is claimed is:

1. A method for generating a transfer request, the method comprising:
   displaying an interface window of a service application on a first terminal;
   in response to a window display request from the service application, displaying, using an independent window presentation interface provided by a system of the first terminal independently of the service application, a resource transfer window (i) that includes information corresponding to the service application and (ii) that is displayed outside of the interface window of the service application, wherein the resource transfer window is displayed independently of the interface window of the service application such that different service applications are configured to display different information in the resource transfer window allowing a user to select different value transfer resources by using the displayed information;
   receiving a user operation via the resource transfer window;
   generating a transfer code request instruction in response to the received user operation;
   obtaining a transfer code corresponding to the transfer code request instruction when the service application detects the transfer code request instruction; and
   after the generating the transfer code request instruction, modifying the displayed resource transfer window including the information corresponding to the service application using a view update interface provided by the system of the first terminal independently of the service application, wherein the modified displayed resource transfer window includes the transfer code, the transfer code being configured for processing by a second terminal to generate the transfer request.

2. The method according to claim 1, wherein the modifying comprises:
   modifying a configuration parameter of the resource transfer window; and
   updating a display state of the resource transfer window according to the modified configuration parameter and displaying the transfer code in the resource transfer window having the updated display state.

3. The method according to claim 2, wherein the resource transfer window is generated by a corresponding view adding interface of a window management type provided by the system of the first terminal, the configuration parameter of the resource transfer window is modified by the view update interface provided by the system, and the resource transfer window is removed by a view removal interface provided by the system.

4. The method according to claim 1, before the displaying the resource transfer window, the method further comprises:
   obtaining the independent window presentation interface and delivering the information corresponding to the service application to the independent window presentation interface.

5. The method according to claim 1, wherein the obtaining the transfer code comprises:
   sending the transfer code request instruction to a management server that generates the corresponding transfer code according to the transfer code request instruction and returns the transfer code.

6. The method according to claim 1, wherein the transfer request includes resource value transfer information and the resource value transfer information is sent to a server to complete resource value transfer.

7. The method according to claim 1, wherein the transfer code includes resource value transfer information indicating a resource value transfer application category and a user identifier having a to-be-transferred resource value.

8. The method according to claim 1, wherein the transfer code is time-sensitive.

9. The method according to claim 1, wherein the transfer code is a graphic code or text code.

10. The method according to claim 1, wherein the transfer code is parsed by the second terminal to obtain resource value transfer information and generate the transfer request based on the resource value transfer information.

11. A first terminal, comprising:
processing circuitry configured to:
display an interface window of a service application on the first terminal;
in response to a window display request from the service application, display, using an independent window presentation interface provided by a system of the first terminal independently of the service application, a resource transfer window (i) that includes information corresponding to the service application and (ii) that is displayed outside of the interface window of the service application, wherein the resource transfer window is displayed independently of the interface window of the service application such that different service applications are configured to display different information in the resource transfer window allowing a user to select different value transfer resources by using the displayed information;
receive a user operation via the resource transfer window;
generate a transfer code request instruction in response to the received user operation;
obtain a transfer code corresponding to the transfer code request instruction when the service application detects the transfer code request instruction; and
after the generating the transfer code request instruction, modify the displayed resource transfer window including the information corresponding to the service application using a view update interface provided by the system of the first terminal independently of the service application of the first terminal, wherein the modified displayed resource transfer window includes the transfer code, the transfer code being configured for processing by a second terminal to generate a transfer request.

12. The first terminal according to claim 11, wherein the processing circuitry is configured to:
modify a configuration parameter of the resource transfer window,
update a display state of the resource transfer window according to the modified configuration parameter, and
display the transfer code in the resource transfer window having the updated display state.

13. The first terminal according to claim 12, wherein the resource transfer window is generated by a corresponding view adding interface of a window management type provided by the system of the first terminal, the configuration parameter of the resource transfer window is modified by the view update interface provided by the system, and the resource transfer window is removed by using a view removal interface provided by the system.

14. The first terminal according to claim 11, wherein the processing circuitry is configured to:

obtain the independent window presentation interface, and
deliver the information corresponding to the service application to the independent window presentation interface.

15. The first terminal according to claim 11, wherein the processing circuitry is configured to send the transfer code request instruction to a management server that generates the corresponding transfer code according to the transfer code request instruction and returns the transfer code.

16. The first terminal according to claim 11, wherein the transfer request includes resource value transfer information and the resource value transfer information is sent to a server to complete resource value transfer.

17. The first terminal according to claim 11, wherein the transfer code includes resource value transfer information indicating a resource value transfer application category and a user identifier having a to-be-transferred resource value.

18. The first terminal according to claim 11, wherein the transfer code is a graphic code or text code.

19. The first terminal according to claim 11, wherein the transfer code is parsed by the second terminal to obtain resource value transfer information and generate the transfer request based on the resource value transfer information.

20. A non-transitory computer-readable storage medium storing instructions which when executed by a processor cause the processor to perform:
displaying an interface window of a service application on a first terminal;
in response to a window display request from the service application, displaying, using an independent window presentation interface provided by a system of the first terminal independently of the service application, a resource transfer window (i) that includes information corresponding to the service application and (ii) that is displayed outside of the interface window of the service application, wherein the resource transfer window is displayed independently of the interface window of the service application such that different service applications are configured to display different information in the resource transfer window allowing a user to select different value transfer resources by using the displayed information;
receiving a user operation via the resource transfer window;
generating a transfer code request instruction in response to the received user operation;
obtaining a transfer code corresponding to the transfer code request instruction when the service application detects the transfer code request instruction; and
after the generating the transfer code request instruction, modifying the displayed resource transfer window including the information corresponding to the service application using a view update interface provided by the system of the first terminal independently of the service application, wherein the modified displayed resource transfer window includes the transfer code, the transfer code being configured for processing by a second terminal to generate a transfer request.

\* \* \* \* \*